INVENTOR.
GEORGE T. SHIMABUKURO
BY
Christie, Parker & Hale
ATTORNEYS.

3,539,790
CHARACTER ORIENTED DATA PROCESSOR WITH FLOATING DECIMAL POINT MULTIPLICATION

George T. Shimabukuro, Honolulu, Hawaii, assignor to Burroughs Corporation, Detroit, Mich., a corporation of Michigan Filed July 3, 1967, Ser. No. 650,737
Int. Cl. G06f 7/54
U.S. Cl. 235—159 3 Claims

ABSTRACT OF THE DISCLOSURE

There is described an electronic digital computer in which operands of variable field length are read out of memory character by character, and the product generated and stored in memory character by character. The decimal point position can be placed anywhere within the data field. The location of the decimal point in the field is identified by a special bit which is set in the digit of the operand immediately adjacent the position of the decimal point.

CROSS-REFERENCES TO RELATED APPLICATIONS

This application is related to copending application Ser. No. 551,035, filed May 18, 1966, by the present inventor and assigned to the same assignee, now Patent No. 3,454,750.

BACKGROUND OF THE INVENTION

In the above-identified patent, there is described a character oriented processor of variable field length in which the decimal point position can be placed anywhere within the data field during an addition or subtraction operation. In the past, floating decimal point operations have been performed by specifying the exponent value to the base ten as part of an operand. While such an arrangement has been incorporated in fixed field length machines, fixing the decimal point position exponent numbers is more difficult to implement in a variable field length character oriented type machine.

SUMMARY OF THE INVENTION

The present invention is directed to a processor which is similar to that described in the above-identified patent in that digits or characters are read out of memory a character at a time, and the length of a field in memory can be any number of characters in length. The processor uses six bit characters in which four of the bits are coded to specify numerical digits, while the remaining two bits are used to identify the sign, the position of the decimal point, and the most significant digit in the field. Thus the fifth bit in the character, when encountered in the least significant character of a field, designates the sign of the data contained in the field, while the same bit when found in any subsequent character designates the position of the decimal point. The remaining or sixth bit of the character identifies the most significant digit, i.e., the end of the field.

In performing the operation of multiplication on two fields, over-and-over addition is used in which the multiplicand is added to itself, character by character, a number of times specified by each digit in the multiplier. A counter counts the number of digits in the multiplicand to the right of the decimal place, the counting being interrupted when the decimal point bit is encountered in one of the digits in the multiplicand. Similarly, the number of digits to the right of the decimal place in the multiplier are counted until the decimal point bit is encountered in the multiplier. The decimal point bit is then set in the output of the adder during the next add cycle following the reading out of the multiplier digit from memory having the decimal point bit for the multiplier. The decimal point bit is then set in the sub-result a number of places to the left of the least significant digit determined by the total count of digits counted in the multiplicand and multiplier, and is carried over during subsequent additions so as to occupy the same relative digit position in the final product.

BRIEF DESCRIPTION OF THE DRAWINGS

For a more complete understanding of the invention, reference should be had to the accompanying drawings wherein.

DESCRIPTION OF THE PREFERRED EMBODIMENT

Figure 1A:
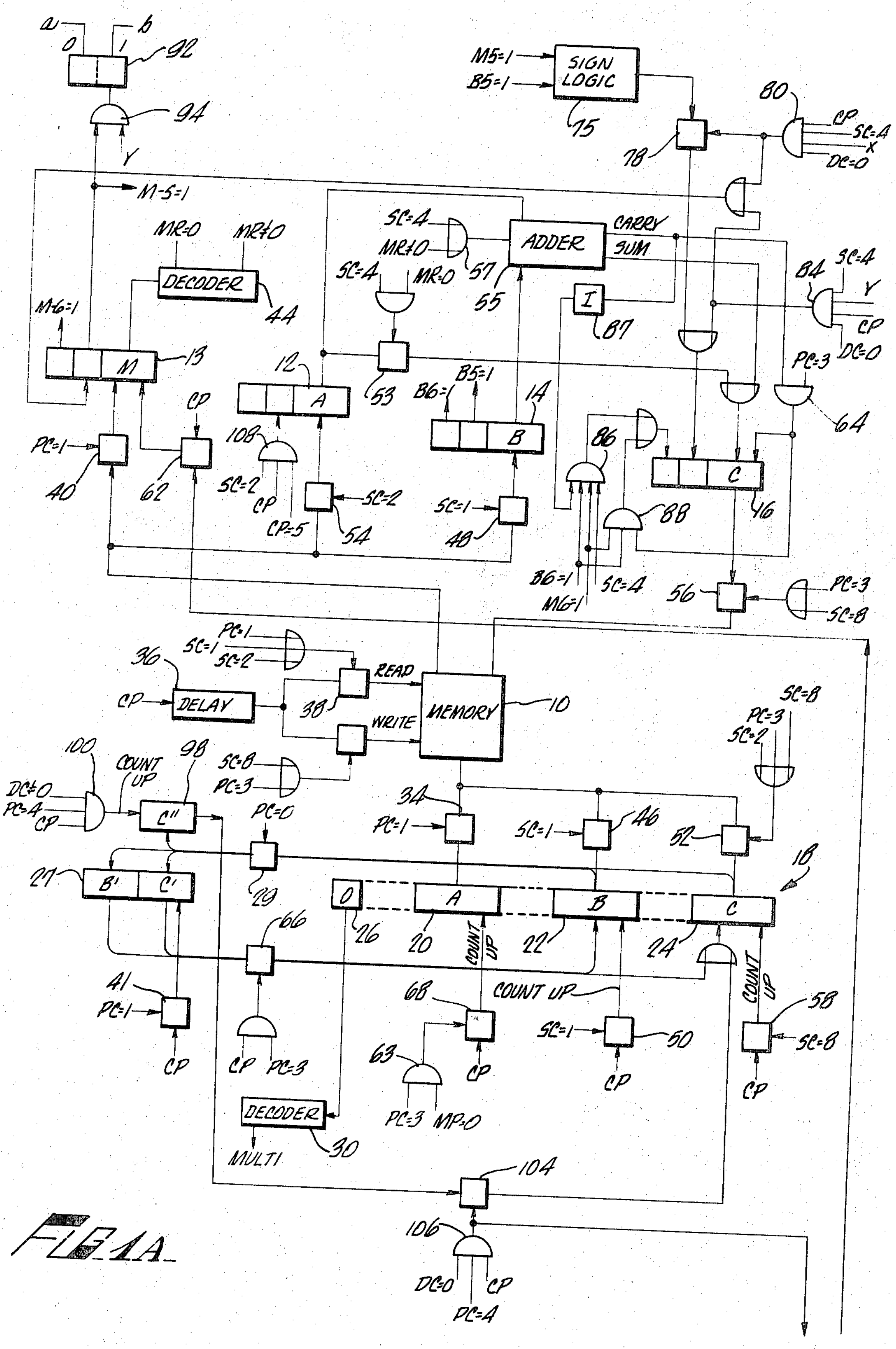
FIGS. 1A and 1B together are a schematic block diagram of one embodiment of the present invention.
Figure 1B:
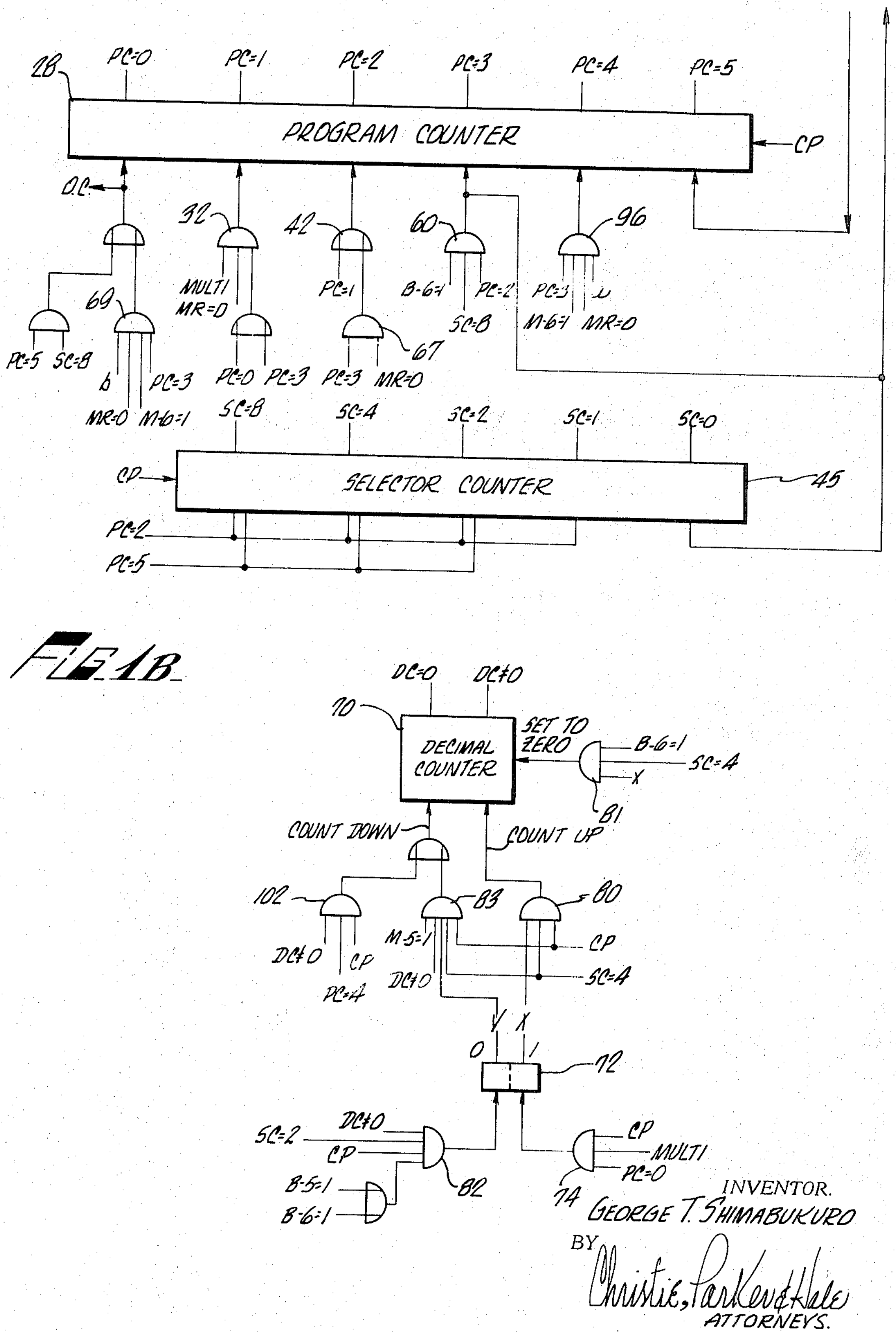

Referring to the drawings in detail, the numeral 10 indicates generally a magnetic core memory in which data is stored in the form of six bit characters, for example, with each character being individually addressable. Four bits of each character specify a binary coded decimal digit of the operand. The fifth bit in each character, when the character is in the least significant digit position of the field, designates the sign of the data in the field. The same bit in any other character position in the field designates the first character to the left of the decimal point in the field. The sixth bit associated with each character designates the most significant character in the field, and since the characters are read out serially starting with the least significant digit, the sixth bit marks the termination of the operand field.

Characters can be read out of the core memory 10 into any of three registers 12, 13, and 14, designated respectively the A-register, the M-register, and the B-register. The characters are written into the core membry 10 from a register 16, designated the C-register. The core memory 10 is addressed from address information carried in three address sections of a command register, indicated generally at 18, the three sections being designated as the A-section 20, the B-section 22, and the C-section 24. In addition, the command register includes an order section 26 which designates the particular instruction to be performed.

A fetch operation in which an instruction is loaded into the command register 18 from a table of instructions, normally stored in the core memory 10, will not be described in detail since such fetch operations of instructions are well known in the art. It is assumed that an instruction has been loaded in the command register 18 in which the order portion in section 26 designates the arithmetic operation of multiplication. The address in the A-section 20 points to the start of an operand field in the core memory 10 which is the multiplier to be used in the multiply operation, and is referred to as the A-field in memory. The B-section 22 contains the address pointing to the first digit of an operand field containing the multiplicand to be used in the multiplication operation and is referred to as the B-field in memory. The C-section 24 contains the address of the start of the field in which the resultant or product of the multiplication operations is to be stored in the core memory and is referred to as the C-field in memory.

To better understand the construction and operation of the invention as described in connection with the figures, it will be assumed that the order calls for multiplication and that the multiplier in the A-field of the core memory 10 is +1.23 and that the multiplicand in the B-field of the core memory 10 is +3.456. The resultant to be stored in the C-field is then +4.25088. The least significant digit in both the A-field (3) and in the B-field (6) has the fifth bit in the character set to one, indicating that each operand has a plus sign. The most significant digit in both fields (3 and 1) has the fifth bit set to 1, indicating that the decimal point is immediately to the right of that digit in the field. Also the sixth bit of the most significant degit in each field is set to 1, indicating that it is the most significant digit and therefore is the last digit in the field.

Operation of the computer is under the control of a program counter 28 which can be set to any one of a number of states, designated $PC=0$ through $PC=5$. In executing a particular instruction in the command register 18 following the fetch operation, the program counter 28 is initially in the $PC=0$ state.

Assuming that an instruction has been loaded in the command register 18 calling for the multiply operation, a decorder 30 connected to the order section 26 of the command register 18 provides a signal on the output line from the decoder 30, designated Multi. This signal is applied to a logical "and" circuit 32 together with the $PC=0$ state and the $MR=0$ line from a decoder 44 coupled to the M-register 13. The output of the "and" circuit 32 advances the program counter 28 to the $PC=1$ state with the next clock pulse (CP) from a clock pulse source, not srown. However, during the $PC=0$ state, the address information in the sections 22 and 24 of the program register 18 are transferred respectively to the B′ C′ sections of a register 27 through a gate 29 so as to preserve the base address of each of the B and C fields in memory. The base address of the C-field is also placed in a C″ register 98.

When the program counter 28 is set to the $PC=1$ state by the output of the "and" circuit 32, the A-field address in the A-section 20 of the program register is gated to memory 10 by a gate 34. A delayed clock pulse applied to the memory 10 through a delay circuit 36 and gate 38, to which the $PC=1$ state is also applied, causes the first digit in the A-field to be transferred out of memory 10 through a gate 40 to the M-register 13. The base address of the C-field in the register 27 is incremented also by the output pulse of a gate 41 during the $PC=1$ state. The output of the program counter is then set to the $PC=2$ state by the next clock pulse in response to the output of an "or" circuit 42 to which the $PC=1$ state is applied.

During the $PC=2$ state of the program counter, an over-and-over addition of the multiplicand takes place, the number of additions being determined by the multiplier digit in the M-register 13. The $PC=2$ state is applied to a selector counter 45 causing it to advance on successive clock pulses repeatedly through the $SC=1$ state, $SC=2$ state, $SC=4$ state, $SC=8$ state and back again to the $SC=1$ state. During the $SC=1$ state of the selector counter, the address in the B-section 22 of the command register 18 is applied to the memory 10 through a gate 46. The first digit of the multiplicand in the B-field of memory is then transferred out of memory through a gate 48 to the B-register 14 in response to the delayed clock pulse applied to the gate 38. At the completion of the $SC=1$ state, the address in the B-section 22 is advanced by one by a clock pulse applied to the count-up input of the section 22 through a gate 50. Thus the address in the B-section 22 points to the next digit in the B-field.

In order to add the multiplicand over and over, it is added each time to the resultant in the C-field. The content of the C-field is initially zero. During the $SC=2$ state, the address in the C-section 24 is therefore applied to the core memory through a gate 52. The digit in memory, initially a zero, is then read into the A-register 12 through a gate 54.

During the $SC=4$ state of the selector counter 45, an adder 55 is activated by an "and" circuit 57 that senses that the $MR\neq 0$ line is true. If the multiplier digit is zero ($MR=0$), no addition takes place, and the digit in the A-register 12 is transferred by a gate 53 to the C-register 16 during the $SC=4$ state. The adder 55 senses the contents of the A-register 12, and B-register 14, placing the result in the C-register 16. If the multiplier digit in the M-register 13 is zero, the sub-product is unchanged. Nevertheless, the fifth and/or sixth bit positions of the content of the M-register may be significant, and may be set in the register 16 during the $SC=4$ state in a manner hereinafter described in detail.

With the selector counter 45 advanced to the $SC=8$ state, the digit in the C-register 16 is written back into the first position in the C-field in the core memory 10 through a gate 56. The address in the C-section 24 is applied to the memory 10 through the gate 52 during the $SC=8$ state. At the end of the $SC=8$ state, the clock pulse increments the address in the C-section 24 through a gate 58.

This operation continues on successively higher order digits of the multiplicand by recycling of the selector counter until the most significant digit of the multiplicand is encountered in the B-register 14. This condition is signalled by a binary one bit in the sixth bit position of the character in the B-register 14 energizing the $B-6=1$ line from the B-register 14. When this is encountered, the program counter 28 is advanced to the $PC=3$ state by the output of a logical "and" circuit 60 which senses the presence of the sixth bit in the B-register 14 by the $B-6=1$ line, senses the $SC=8$ condition of the selector counter 45, and the $PC=2$ condition of the program counter. The output of the logical "and" circuit 60 is also used to set the selector counter back to the $SC=0$ state, terminating the addition operation. The output of the logical "and" circuit 60 is also used to count down the digit in the M-register 13 by means of a gate 62 to which a clock pulse is applied.

Because the addition may have produced a "carry" from the addition of the most significant digit of the multiplicand, during the $PC=3$ state, an "and" circuit 64 establishes a one in the C-register 16 if a "carry" is present in the adder 55. The zero or one in the C-register 16 is then transferred to the next higher location in the C-field of the memory 10 by applying the $PC=3$ state to the gate 56 and to the gate 52, as well as to the gate 38. The next clock pulse during the $PC=3$ state then gates the contents of the register 27 back to the B-section 22 and C-section 24 through a gate 66 so as to restore the base addresses of the B and C fields in memory. At the same time, unless the M-register 13 is zero, the program counter 28 is returned to the $PC=2$ state by the output of an "and" circuit 67.

The above operation continues until the M-register 13 is counted down to zero, indicating that the over-and-over addition has been repeated the number of times required by the least significant digit of the multiplier. With the output of the decoder 44 indicating the $MR=0$ condition of the M-register 13, the program counter 28 is reset to the $PC=1$ state from the $PC=3$ state by the output of an "and" circuit 32. As described above, during the $PC=1$ state, the next multiplier digit is transferred from the memory 10 to the M-register 13. It should be noted that the address of the A-field containing the multiplier in the memory 10 is incremented during the $PC=3$ state when the M-register 13 is counted down to the zero condition. To this end, the $PC=3$ state and the $MR=0$ state are applied to a logical "and" circuit 63, the output of which is applied to a gate 68 for gating the next clock pulse to count up the address in the A-section 20 of the command register 18.

The program counter 28 again advances to the $PC=2$ state in which the multiplicand is added to the partial result starting at the next to the least significant digit. The addition is repeated on the full multiplicand a number of times indicated by the value of the next multiplier digit. The above described cycles of operation continue until the most significant digit of the multiplier is placed in the M-register 13 and counted down to zero. The most significant digit of the multiplier is identified in the M-register 13 by the sixth bit being a binary one. This is indicated by an output signal on the $M-6=1$ line from the M-register 13. Since this signals the end of the multiplication operation, the program counter 28 is returned to the $PC=0$ state by a logical "and" circuit 69 which senses that the M-register 13 is counted back to zero ($MR=0$), that the sixth bit is a one as indicated by the $M-6=1$ condition, that a control flip-flop 92 is set to one as indicated by a line *b*, and that the program counter is in the $PC=3$ state. The output of the logical "and" circuit 69 is also used as an Operation Clear (OC) signal for clearing all the registers, setting the control flip-flops back to zero and initiating the fetch cycle for the next instruction.

During the multiplication operation, the sign of the product must be set by setting the fifth bit in the least significant digit of the product. Also the decimal point of the product must be fixed by setting the fifth bit of the proper digit in the product. Both of these operations utilize a decimal counter 70. If the decimal counter 70 is in the zero count condition, it energizes an output line designated $DC=0$. Any other condition of the decimal counter 70 energizes an output line designated $DC\neq0$. Control of the decimal counter 70 includes a decimal control flip-flop 72. Initially, both the decimal counter 70 and control flip-flop 72 are set to zero. With the program counter in the $PC=0$ state, when the output of the decoder 30 indicates a multiply operation is to take place, the decimal control flip-flop 72 is set to one by the output of a logical "and" circuit 74 that senses that the Multi output of the decoder 30 is true and that the $PC=0$ state of the program counter 28 is true. Since the fifth bit of the last significant digit of the multiplier and the multiplicand indicates the sign, the fifth bit of the multiplier in the M-register 13 sets the level on an $M-5=1$ line, while the multiplicand digit in the B-register 14 sets the level on the $B-5=1$ line. These levels are applied to a sign logic circuit 75, the output of which is true if the signs are alike. The output of the sign logic circuit is applied through a gate 78 to the fifth bit position of the C-register 16. The gate 78 is controlled by the output of a logical "and" circuit 80 which senses that the selector counter is in the $SC=4$ state, that the decimal couner 70 is in the $DC=0$ state, and that the decimal flip-flop 72 is in the one state, indicated by the level on the output line, designated X in the figure. Since these conditions are simultaneously true only during the first pass of the selector counter through the $SC=4$ state, the sign is set on the least significant digit of the product before it is transferred from the C-register 16 back to the C-field in the memory 10. The output of the "and" circuit 80 is also used to reset the sign bit in the register 13 so that the $M-5=1$ line can not remain true after the sign has been set.

In order to set the decimal point bit in the proper digit of the product, the decimal counter 70 is counted up as each digit of the multiplicand is transferred to the B-register 14 for the first time. Counting up of the decimal counter is interrupted when the decimal position is identified by the fifth bit in one of the multiplicand digits. To this end, the decimal counter 70 is counted up by the output of the logical "and" circuit 80 which senses that the decimal control flip-flop 72 has been set to one and that the selector counter is in the $SC=4$, state. Thus the decimal counter continues to count up once each time a new multiplicand digit is brought into the B-register 14 by the cycling of the selector counter 45 through the $SC=4$ state.

When the multiplicand digit is placed in the B-register 14 having the decimal point bit set to one in the fifth bit position of the character, the B–5=1 line from the B-register 14 goes true. This is applied to a logical "and" circuit 82 together with the $DC\neq0$ condition of the decimal counter 70 and the SC=2 state of the selector counter 45. The $DC\neq0$ line can only be true after the least significant digit, in which the fifth bit indicates a sign and not a decimal, has been counted. The output of the "and" circuit 82 is connected to the flip-flop 72 to set it to zero. As a result, the decimal control flip-flop 72 is returned to the zero state preventing further counting of the decimal counter 70. It will be recognized that the decimal counter 70 now indicates the number of digits to the right of the decimal point in the multiplicand as it is read out of the B-field in memory. If the multiplicand is a whole number, the counter 70 is reset to zero by the output of an "and" circuit 81 that senses the $B-6=1$ line is true and the control flip-flop 72 is on.

As the multiplication operation goes forward with the over-and-over addition of the multiplicand, the multiplier digit having a decimal point bit set in the fifth bit position of the character in the M-register 13 is encountered. This sets the $M-5=1$ line from the output of the M-register 13 to one. When this condition is encountered, the C-section 24 has already been counted up from the base address by an amount corresponding to the number of digits encountered in the multiplier. This is accomplished, as explained above, by the output of the gate 41. If the address in the C-section 24 is now counted up by an amount equal to the count condition of the decimal counter 70, it will point to the digit position in the resultant stored in the C-field where the decimal point should be placed in the product. This is accomplished by counting down the decimal counter 70 as each digit of the multiplicand is transferred out of memory after the $M-5=1$ line from the M-register 13 is true. The count down of the decimal counter 70 is by the output of a logical "and" circuit 83 to which is applied the $SC=4$ state of the selector counter 45, the $M-5=1$ state from the M-register 13, the $DC\neq0$ condition of the decimal counter 70 and the zero state of the decimal flip-flop control 72. Since the selector counter 45 cycles through the $SC=4$ state once for each multiplicand digit transferred to the B-register, the decimal counter 70 is returned to the zero count condition when the product or resultant digit immediately to the left of the decimal point is in the C-register 16.

In order to set the fifth bit in the register 16 to establish the decimal point in the product stored in the C-field of the memory 10, a logical "and" circuit 84 senses that the $M-5=1$ condition of the M-register 13 is present, that the selector counter is in the $SC=4$ condition, that the decimal counter is returned to the $DC=0$ condition, and that the decimal control flip-flop 72 is in the zero state. The output of the logical "and" circuit 84 sets the decimal bit in the C-register 16 before it is transferred by the gate 56 into the C-field of the memory 10. The $M-5=1$ line is turned off by the output of the "and" circuit 84 which resets the fifth bit flip-flop in the M-register 13.

If the multiplicand is a whole number, the counter 70 is reset to zero by the "and" circuit 81. Since no counting down is required when the decimal bit in the multiplier digit sets the $M-5=1$ line, the decimal point bit is set in the C-register during the next successive add cycle by the output of AND circuit 84. If the multiplier is a whole number, a different problem is presented because this can not be determined until all the multiplier digits are encountered. The setting of the decimal in the product when the multiplier is a whole number is described in detail below.

At the completion of the multiplication operation, the sixth bit in the product in the C-field of the memory 10 must be set to indicate the most significant digit of the product. This is accomplished by a logical "and" circuit 86 which senses by means of an inverter 87 that there is no "carry" from the adder, that the $B-6=1$ condition and the $M-6=1$ condition are present, and that the $SC=4$ state of the selector counter 45 is present. The output of the logical "and" circuit 86 sets the sixth bit in the C-register 16. However, if a "carry" is present, an additional digit one must be added to the C-field as the most significant digit position of the C-field. In this case, the sixth bit is set in response to the output of a logical "and" circuit 88. The "and" circuit 88 senses that the B-counter is in the $B-6=1$ state, that the M-register is in the $M$–6=1 state, and that the output of the "and" circuit 64 is true.

To place the decimal point when the multiplier is a whole number, use is made of a second control flip-flop 92 that is set by the $M$–5=1 line and the zero state (Y line) of the decimal control flip-flop 72 through an "and" circuit 94. If the decimal point is not encountered, the second control flip-flop 92 will not be set but will remain in the zero state. Consequently, at the end of the multiplication operation, the program counter 28 is reset to the $PC$=0 state only if the second control flip-flop 92 has been set to one, as sensed by the B line from the second control flip-flop 92, and applied to the "and" circuit 60. On the other hand, if the decimal point bit has not been encountered in the multiplier and the second control flip-flop 92 remains in the zero state, the program counter is set to the $PC$=4 state. This is accomplished by the output of an "and" circuit 96 which senses the zero state of the second control flip-flop 92 together with the $MR$=0 condition of the M-register 13, the $M$–6=1 bit of the most significant digit, and the $PC$=3 state of the program counter.

During the $PC$=4 state, the register 98, which stores the base address of the C-field, is counted up by the output of an "and" circuit 100. At the same time, the decimal counter 70 is counted down by the output of an "and" circuit 102. Both the "and" circuits 100 and 102 sense the $DC \neq 0$ state and the $PC$=4 state. When the decimal counter is counted down to zero, the address in the register 98 will point to the proper digit in the C-field for placement of the decimal point bit. Placement is accomplished by gating the address in the register 98 through a gate 104 to the C-section 24 of the command register 18. The gate 104 is controlled by the output of an "and" circuit 106 which senses the $PC$=4 state and the $DC$=0 state. The output of the "and" circuit 106 also advances the program counter to the $PC$=5 state.

The $PC$=5 state is applied to the selector counter 45 so as to advance the selector counter through the $SC$=2, $SC$=4, and $SC$=8 states. This causes the selected digit in the C-field to be read out to the A-register 12, to be transferred to the C-register 16, and to be written back into memory 10. The fifth bit is set in the A-register 12 by the output of an "and" circuit 108 during the $SC$=2 state of the selector counter 45 and the $PC$=5 state of the program counter. The program counter is then returned to the $PC$=0 state during $SC$=8 and an OC pulse is generated, terminating the operation.

From the above description, it will be seen that a character by character multiplication operation is carried out with a floating decimal point. The decimal point is fixed in the product by control of extra bits in the characters of the multiplier and muliplicand indicating the location of the decimal points in the multiplier and multiplicand. The decimal point may be positioned anywhere in the field of the both operands, to provide floating decimal point operation.

It should be noted that, if it is assumed that the decimal point bit is always present, i.e., there is always at least one digit to the right of the decimal point in both the multiplicand and the multiplier, the circuit of the preferred embodiment may be simplified to some extent. The counter 70 need not be used to count multiplicand digits during the first pass. Rather, when the decimal point bit is encountered after the decimal point bit in the multiplier is encountered, the decimal bit is immediately set in the output of the adder. Thus the decimal bit in the register 16 is set when both the $B$—5=1 line and the $M$—5=1 line are true and it is not the first digit in the multiplier and multiplicand.

What is claimed is:

1. A multiplication system for multiplying two variable length operands where the decimal point location of each operand is stored as a special bit with the digit immediately to the left of the decimal point location, comprising storage means having the digits of a multiplicand stored in a first section, the digits of a multiplier stored in a second section, and the digits of a resultant in a third section, a register, means reading out each of the digits of the multiplier serially from storage into the register, an adder, means reading out each of the digits of the multiplicand serially together with each of the digits of a resultant in the third section of storage, said means coupling the respective digits as they are read out of the first and third sections to the adder and storing each of the successive resultant digits from the adder into the third section of storage, means for operating said last-named means to repeatedly read out each of the multiplicand digits a number of times determined by the value of each multiplier digit in the register, means responsive to each successive multiplier digit read out to the register for shifting by one digit position the first digit of the resultant in the third section of storage read out to the adder, a counter, means advancing the counter with each digit of the multiplicand read out of storage, means interrupting the counter advancing means in response to the special bit in a multiplicand digit read out of storage, means responsive to the presence of the special bit in the multiplier digit in the register for reducing the counter with each subsequent digit of the multiplicand read out of storage, and means setting the special bit in the output of the adder when the counter is reduced to zero.

2. Apparatus as defined in claim 1 further including means sensing the last digit of the multiplicand as it is read out of the first section of storage, means responsive to the sensing means for indicating the absence of the special bit in any of the multiplicand digits read out of storage, and means responsive to said indicating means for resetting the counter to zero.

3. Apparatus as defined in claim 1 further including means sensing the last digit of the multiplier in said register, means responsive to the sensing means for indicating the absence of the special bit in any of the multiplier digits read out of storage, and means responsive to said indicating means and the count condition of said counter for selectively reading out and returning the digit from the position in the third section of storage corresponding to the setting of said counter, said last-named means including means setting the special bit in the selected digit.

References Cited

UNITED STATES PATENTS

| | | | |
|---|---|---|---|
| 3,454,750 | 7/1969 | Shimabukuro | 235—159 |
| 3,016,194 | 1/1962 | Bensky et al. | 235—159 X |
| 3,193,669 | 7/1965 | Voltin | 235—164 |

MALCOLM A. MORRISON, Primary Examiner

D. H. MALZAHN, Assistant Examiner